US006906881B2

(12) United States Patent
Chliwnyj et al.

(10) Patent No.: US 6,906,881 B2
(45) Date of Patent: Jun. 14, 2005

(54) APPARATUS AND METHOD TO ERASE A MAGNETIC TAPE

(75) Inventors: Alex Chliwnyj, Tucson, AZ (US); Scott M. Fry, Oro Valley, AZ (US); Pamela R. Nylander-Hill, Tucson, AZ (US); David L. Swanson, Tucson, AZ (US)

(73) Assignee: International Business Machines Corporation, New York, NY (US)

( * ) Notice: Subject to any disclaimer, the term of this patent is extended or adjusted under 35 U.S.C. 154(b) by 319 days.

(21) Appl. No.: 10/186,309

(22) Filed: Jun. 27, 2002

(65) Prior Publication Data

US 2004/0001271 A1 Jan. 1, 2004

(51) Int. Cl.⁷ .............................................. G11B 5/024
(52) U.S. Cl. ...................... 360/66; 360/69; 360/72.1; 360/77.12
(58) Field of Search .............................. 360/66, 31, 53, 360/69, 71, 72.1, 75, 77.12; 361/151

(56) References Cited

U.S. PATENT DOCUMENTS 3,717,846 A * 2/1973 Kanda et al. ............... 714/817
5,166,839 A 11/1992 Yu ............................... 360/60
5,394,278 A 2/1995 Pahr et al. .................... 360/66
5,757,571 A 5/1998 Basham et al. ............. 360/72.1
5,901,004 A * 5/1999 Kikuchi et al. ............... 360/53
5,969,893 A 10/1999 Basham et al. ............... 360/49
6,282,040 B1 8/2001 Bartlett ........................ 360/48
6,469,854 B1 * 10/2002 Gill et al. ..................... 360/53
6,493,166 B1 * 12/2002 Takayama .................... 360/69
6,507,911 B1 * 1/2003 Langford .................... 713/193
6,603,624 B1 * 8/2003 Takayama .................... 360/69

* cited by examiner

Primary Examiner—David Hudspeth
Assistant Examiner—James L Habermehl
(74) Attorney, Agent, or Firm—Dale F. Regelman

(57) ABSTRACT

A method to erase a magnetic tape, where the magnetic tape is first mounted in a magnetic tape in a tape drive, where that magnetic tape includes a physical beginning of tape ("PBOT"), a physical end of tape ("PEOT"), and information written thereon between the PBOT and the PEOT. The method then establishes one or more critical areas located on the magnetic tape, attempts to erase the information, and determines if each of the one or more critical areas have been erased. In the event each of said one or more critical areas have not been erased, Applicants' method provides an error message.

21 Claims, 11 Drawing Sheets

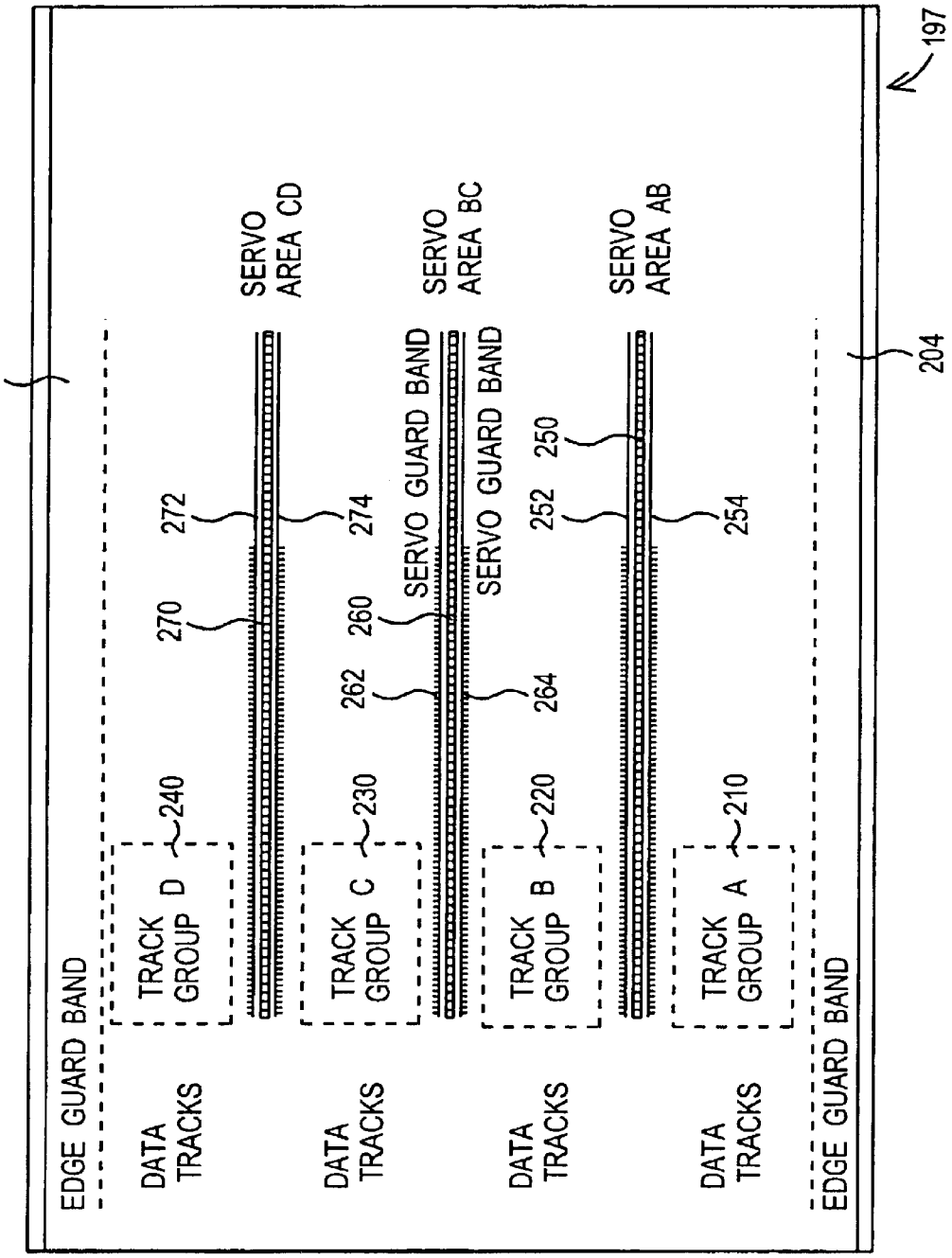

FIG. 2B

| HEAD TRACK NO. | HEAD MODULE | |
|---|---|---|
| | L | R |
| 1 | WR | RD |
| 2 | RD | WR |
| 3 | WR | RD |
| 4 | RD | WR |
| 5 | WR | RD |
| 6 | RD | WR |
| 7 | WR | RD |
| 8 | RD | WR — 272 |
| SERVO | LS1 | RS1 — 274 |
| SERVO | LS2 | RS2 — 278 |
| 9 | WR | RD — 276 |
| 10 | RD | WR |
| 11 | WR | RD |
| 12 | RD | WR |
| 13 | WR | RD |
| 14 | RD | WR |
| 15 | WR | RD |
| 16 | RD | WR — 262 |
| SERVO | LS3 | RS3 — 264 |
| SERVO | LS4 | RS4 — 268 |
| 17 | WR | RD — 266 |
| 18 | RD | WR |
| 19 | WR | RD |
| 20 | RD | WR |
| 21 | WR | RD |
| 22 | RD | WR |
| 23 | WR | RD |
| 24 | RD | WR — 252 |
| SERVO | LS5 | RS5 — 254 |
| SERVO | LS6 | RS6 — 258 |
| 25 | WR | RD — 256 |
| 26 | RD | WR |
| 27 | WR | RD |
| 28 | RD | WR |
| 29 | WR | RD |
| 30 | RD | WR |
| 31 | WR | RD |
| 32 | RD | WR |

275 brackets 272, 274, 278, 276
265 brackets 262, 264, 268, 266
255 brackets 252, 254, 258, 256

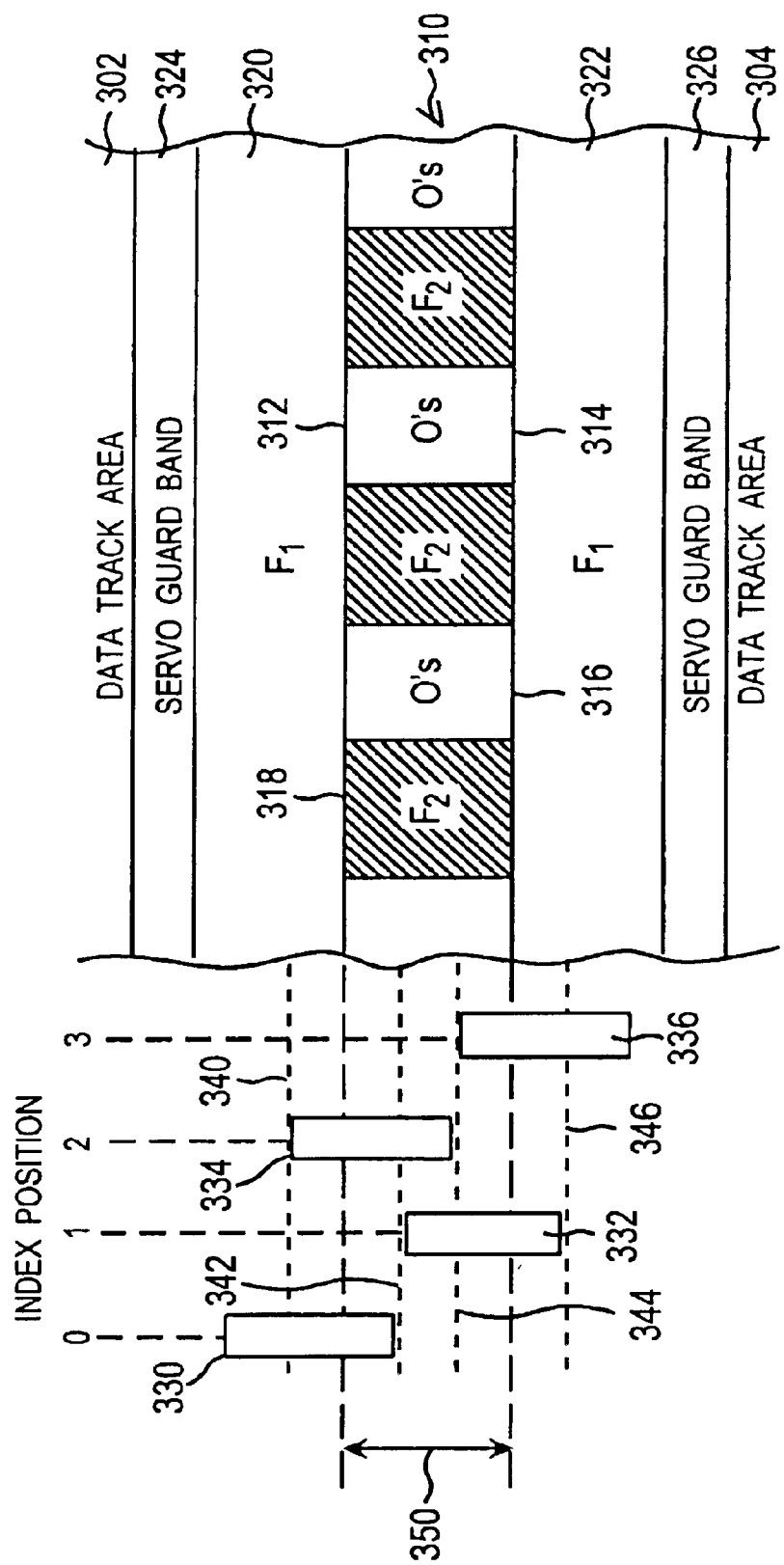

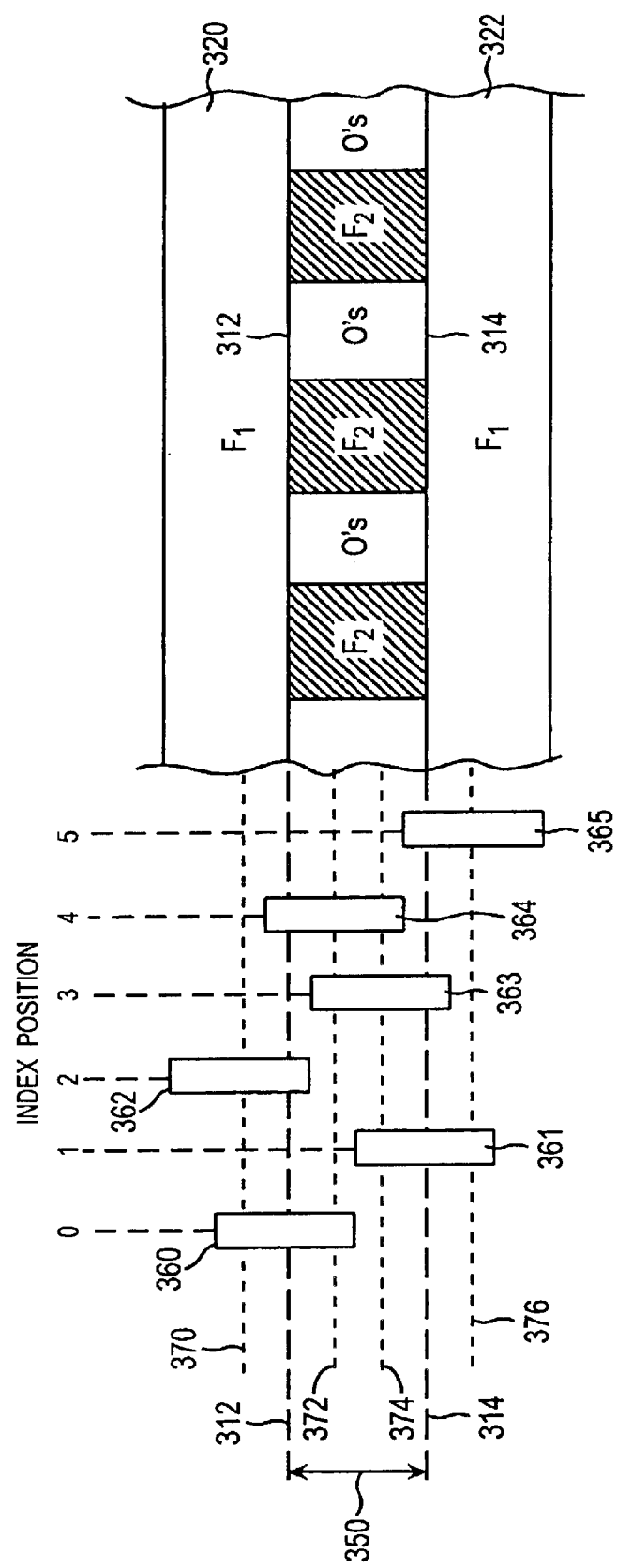

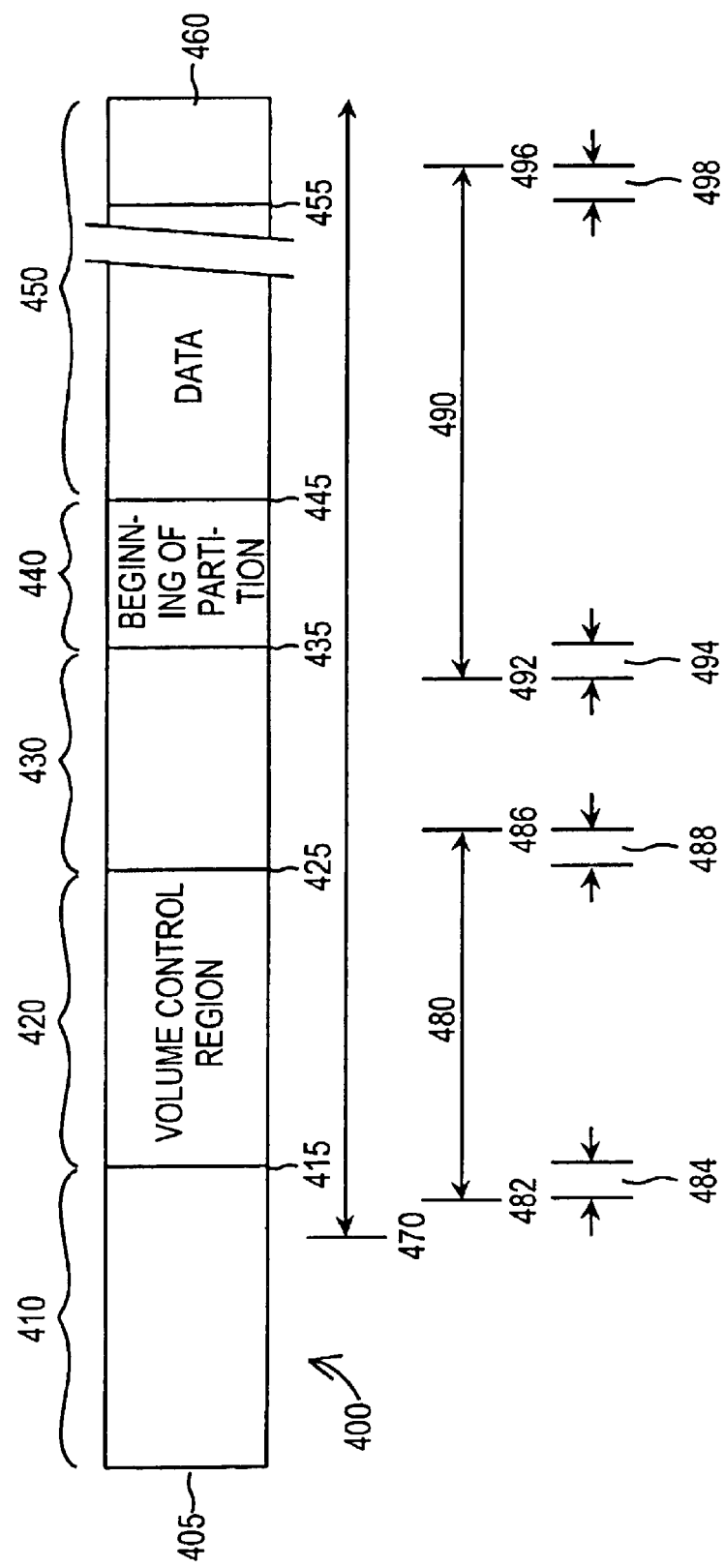

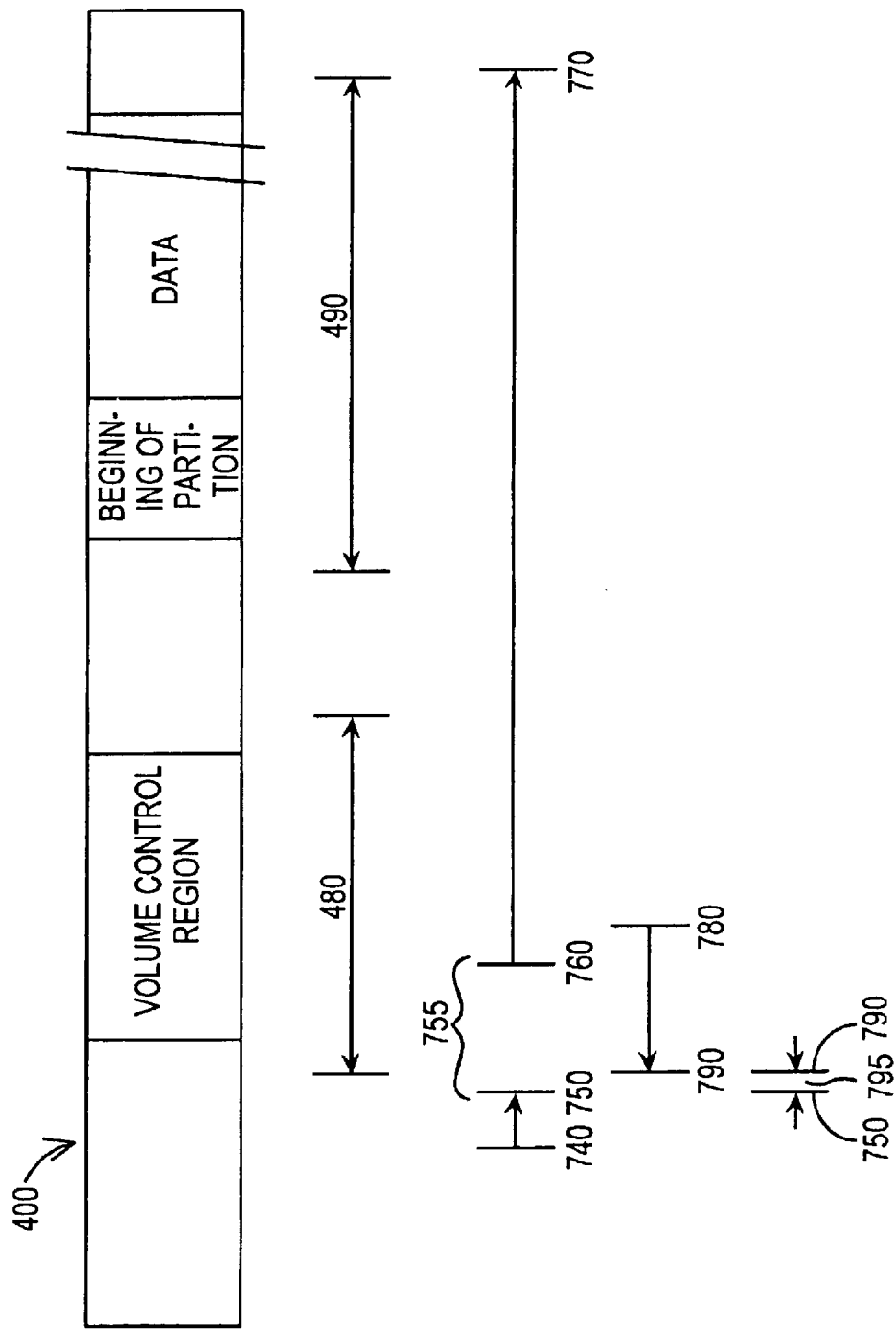

APPARATUS AND METHOD TO ERASE A MAGNETIC TAPE

FIELD OF THE INVENTION

This invention relates to an apparatus and method to read and/or write information to a magnetic tape. In certain embodiments, this invention relates to servo track following a moving magnetic tape having one or more servo edges of dissimilar recorded servo signals.

BACKGROUND OF THE INVENTION

Automated media storage libraries are known for providing cost effective access to large quantities of stored media. Tape cartridges containing a moveable magnetic tape are often used in automated data storage libraries. Tape media, such a magnetic tape, is a common medium for the storage of data to be utilized by a computer. Magnetic tape has found widespread use as a data storage medium because it provides a relatively inexpensive solution for storing large amounts of data.

Magnetic tape data storage typically provides one or more prerecorded servo tracks to allow precise positioning of a tape head with respect to those prerecorded servo tracks. Servo sensors disposed on the tape head are used to track the recorded servo tracks. The tape head comprises one or more read/write elements precisely positioned with respect to those servo sensors. One example of a magnetic tape system is the IBM 3590, which employs magnetic tape having prerecorded servo patterns that include three parallel sets of servo edges, each servo edge being an interface between two dissimilar recorded servo signals, each set of servo edges comprising one servo edge on each of opposite lateral sides of a middle recorded servo signal.

In certain embodiments, the tape head includes a plurality of servo sensors for each servo edge, with the result that the tape head may be stepped between those servo sensors, each positioning the read/write elements at different interleaved groups of data tracks. Typically, for a given servo pattern of a set of two servo edges, the outer servo signals are recorded first, and the center servo signal is recorded last, to provide the servo edges. The nominal separation distance between the servo edges of each set of servo edges is a certain distance, but there is variation in the magnetic separation between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation distance of the prerecorded servo tracks from nominal, the prerecording of the servo tracks is conducted at different amplitudes so as to attempt to compensate for the physical difference and provide a magnetic pattern that is closer to nominal. Thus, the difference in physical distance and the amplitude compensation may tend to offset each other with respect to the apparent distance between the servo tracks. These actions may provide an adequate signal for track following at the servo edges.

However, to increase track density, a servo sensor may be indexed to positions laterally offset from the linear servo edges to provide further interleaved groups of data tracks. The indexed positions are determined by measuring the ratio between the amplitudes of the two dissimilar recorded servo signals. Thus, when the amplitudes of the recorded servo signals are varied to compensate for physical distance variations, track following the prerecorded servo edges at the offset indexed positions becomes less precise. As the result, the data tracks may vary from the desired positions, i.e. be "squeezed" together, such that writing on one track with a write element that is subject to track misregistration (TMR) may cause a data error on the immediately adjacent data track.

SUMMARY OF THE INVENTION

Applicants' invention includes a method to erase a magnetic tape. Applicants' method first mounts a magnetic tape in a tape drive, where that magnetic tape includes a physical beginning of tape ("PBOT"), a physical end of tape ("PEOT"), and information written thereon between the PBOT and the PEOT. Applicants' method then establishes one or more critical areas located on the magnetic tape. Applicants' method erases the information, and determines if each of the one or more critical areas have been erased. In the event each of said one or more critical areas have not been erased, Applicants' method provides an error message.

Applicants' invention further includes an article of manufacture comprising a computer useable medium having computer readable program code disposed therein for erasing a magnetic tape. Applicants' invention further includes a computer program product usable with a programmable computer processor having computer readable program code embodied therein for erasing a magnetic tape.

BRIEF DESCRIPTION OF THE DRAWINGS

The invention will be better understood from a reading of the following detailed description taken in conjunction with the drawings in which like reference designators are used to designate like elements, and in which:

FIG. 2A is a diagrammatic illustration of a magnetic tape having three parallel sets of linear servo edges, each servo edge comprising an interface between two dissimilar recorded servo signals;

FIG. 2B is a block diagram showing one embodiment of a magnetic tape head;

FIG. 3A is a detailed diagrammatic representation of a magnetic tape format providing four servo index positions in one set of two linear servo edges of the magnetic tape of FIG. 2A;

FIG. 3B is a detailed diagrammatic representation of a magnetic tape format providing six servo index positions in one set of two linear servo edges of the magnetic tape of FIG. 2A;

FIG. 4 is a block diagram showing the logical image of a recorded magnetic tape;

FIG. 7B is a block diagram showing a second implementation of Applicants' method.

DETAILED DESCRIPTION OF THE PREFERRED EMBODIMENTS

This invention is described in preferred embodiments in the following description with reference to the Figures, in which like numbers represent the same or similar elements. The invention will be described as embodied in an apparatus and method to erase information from a magnetic tape.

Figure 1:
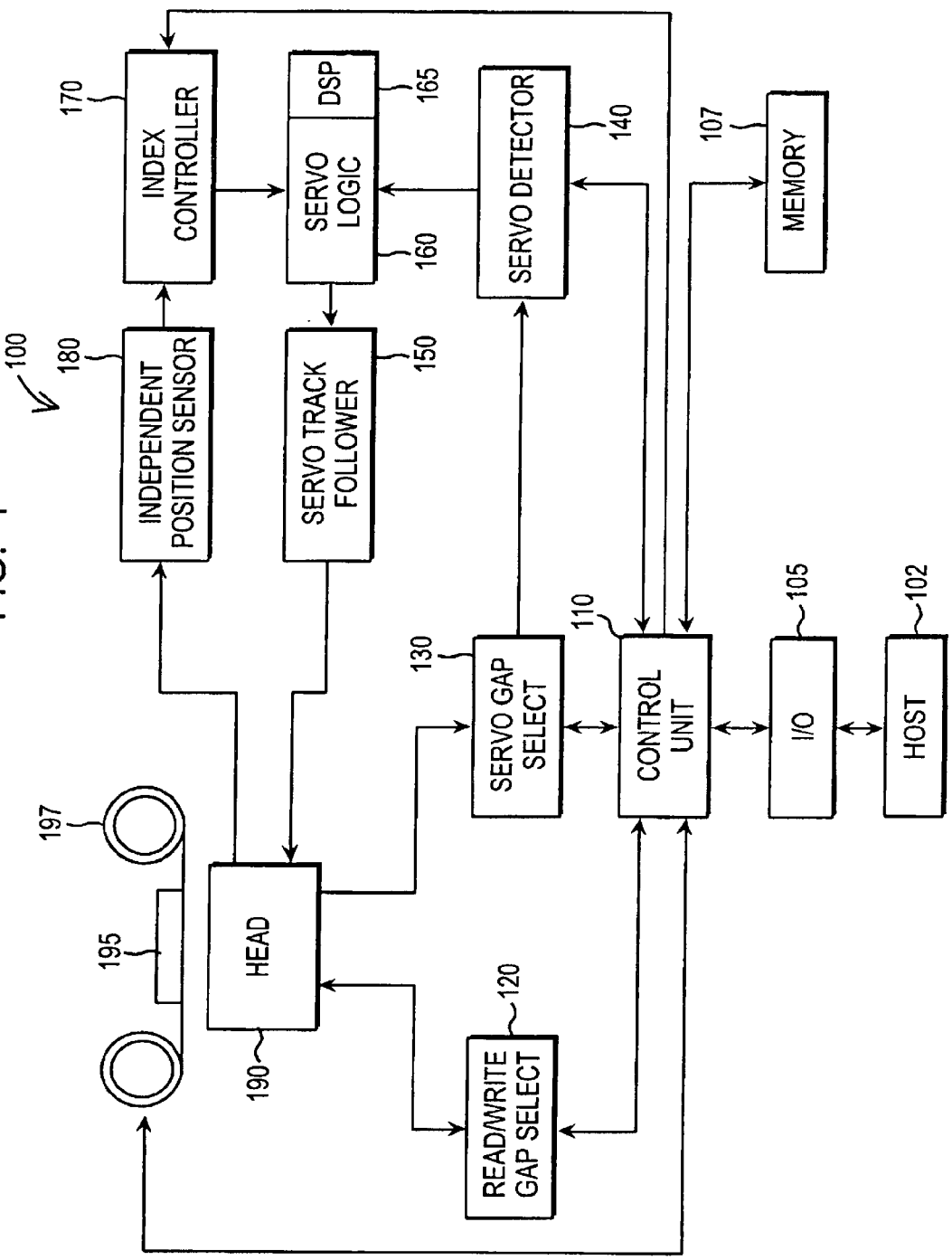
FIG. 1 is a block diagram of an embodiment of a magnetic tape system employing the present invention.

FIG. 1 shows magnetic tape data storage system 100. Control unit 110 receives and transmits data and control signals to and from a host device 102 via an interface 105. The control unit 110 is coupled to a memory device 107, such as a random access memory for storing information and computer programs. An example of a host device 102 comprises an IBM RS/6000 processor.

A multi-element tape head 190 includes a plurality of read/write elements to read and/or record information from and/or to a magnetic tape 197, and servo sensors to detect servo signals comprising prerecorded linear servo edges on the magnetic tape 197. In certain embodiments, magnetic tape head 190 comprises a thin-film magneto-resistive transducer. In an illustrative embodiment, tape head 190 may be constructed as shown in FIG. 2B. The length of the tape head 190 substantially corresponds to the width of the tape 197. In certain embodiments tape head 190 includes thirty-two read/write element pairs (labeled "RD" and "WR") and three sets of servo read elements (e.g. LS1 272, RS6 258) corresponding to the three servo areas 250 (FIG. 2A), 260 (FIG. 2A), and 270 (FIG. 2A). In the illustrated embodiment, the thirty-two read/write element pairs are divided into groups of eight, adjacent groups being separated by two tracks occupied by a group of four servo sensors. Each group of four servo sensors may be referred to as a "servo group", e.g. servo group 255, servo group 265, and servo group 275.

In the illustrated embodiments, tape head 190 includes left and right modules separately fabricated, then bonded together. Write and read elements alternate transversely down the length of each module (i.e., across the width of the tape), beginning with a write element in position on the left module and a read element in the corresponding position on the right module. Thus, each write element in the left module is paired with a read element in the corresponding position on the right module and each read element in the left module is paired with a write element in the corresponding position on the right module such that write/read element pairs alternate transversely with read/write element pairs.

A tape reel motor system (not shown in FIG. 1) moves the tape 197 in a first direction, and optionally in an opposing second direction, along a first axis, i.e. the longitudinal axis of the tape, while it is supported by a tape deck 195 for reading and writing. In certain embodiments, the tape deck 195 does not precisely hold the tape in position laterally. Rather in these embodiments, open channel guiding may be employed in which the magnetic tape can move laterally.

A servo track follower 150 directs the motion of the magnetic tape head 190 in a lateral or transverse direction relative to the, longitudinal direction of tape motion, i.e. the tape head moves in a third and an opposing fourth direction along a second axis, where that second axis is substantially orthogonal to the first axis described above. The control unit 110 is coupled to one or more tape reel motors and controls the direction, velocity and acceleration of the tape 197 in the longitudinal direction.

The data tracks on the tape 197 are arranged in parallel and are parallel to the linear servo edges. Thus, as the servo track follower 150 causes the servo sensors of the magnetic tape head to track follow a linear servo edge or a servo index position laterally offset from a servo edge, the read/write elements track a parallel group of the data tracks. If it is desired to track another parallel group of data tracks, the magnetic tape head 190 is indexed laterally to another servo edge or to another servo index position, or a different servo sensor is aligned with the same or a different servo edge or servo index position.

When the magnetic tape head 190 is to be moved to a selected index position, an index controller 170 is enabled by the control unit 110, receiving a lateral position signal from an independent position sensor 180 and transmits an appropriate signal to servo logic 160 to select the appropriate servo track, while the control unit 110 transmits an appropriate signal to a servo gap selector 130 to select the appropriate servo sensor. The independent position sensor 180 is discussed in the incorporated U.S. Pat. No. 5,9316,159, where it is called a non-servo position sensor, and indicates the lateral mechanical position of the tape head 190 with respect to the tape deck 195.

Over the course of longer distances of longitudinal tape movement, the open channel guiding system will allow the tape to move laterally with respect to the tape deck 195. In accordance with the present invention, the independent position sensor 180, in limited distances of tape movement, accurately tracks the lateral mechanical position of the tape head 190, and therefore of the servo sensor(s), with respect to the magnetic tape 197 and of the servo edges. The logic 160 operates the servo track follower 150 in accordance with the present invention to calibrate the servo index positions as sensed by the servo sensor with respect to the parallel sets of linear servo edges, as will be explained. The logic 160 may comprise a programmed PROM, ASIC or microprocessor.

The tape system 100 may be bidirectional, in which ones of the read/write elements are selected for one direction of longitudinal tape movement, and others of the read/write elements are selected for the opposite direction of movement. The control unit 110 additionally selects the appropriate ones of the read/write elements by transmitting a signal to a read/write gap select unit 120.

Once a servo edge or edges are selected, the servo gap selector 130 provides the servo signals to a servo detector 140, which information is employed by servo logic 160 to position the tape head 190 to track follow the detected edges. In accordance with the present invention, servo logic 160 employs the servo information sensed by the servo detector 140 and the mechanical positioning information from the independent position sensor 180 to calibrate the track following servo. The track following servo logic is also implemented in the servo logic 160 employing the sensed servo signals to determine the ratios of the sensed servo signals, which are employed in accordance with the present invention to track a designated servo index position.

Referring to FIG. 2A, a plurality, for example, three, parallel sets of linear servo edges 250, 260 and 270 are illustrated, each servo edge comprising an interface between two dissimilar recorded servo signals, each set of servo edges comprising one of the servo edges on each of opposite lateral sides of a middle recorded servo signal. As an example, a corresponding plurality of laterally offset servo sensors, i.e. servo sensor groups 255 (FIG. 2B), 265 (FIG. 2B), 275 (FIG. 2B), are disposed on tape head 190 to sense the servo signals at each corresponding edge. Additional pluralities of servo sensors, i.e. sensors 272, 274, 276, 278, may be provided to allow positioning of the tape head at additional data tracks.

Referring to FIG. 3A, the typical magnetic tape format of servo signals to form linear servo edges 312 and 314 comprising an interface between two dissimilar recorded servo signals is illustrated. One set of servo edges comprises outer bands 320 and 322, having a recorded pattern of a constant amplitude signal of a single first frequency, on either side of an inner band 310 of the other servo signal, having a recorded pattern alternating between a constant amplitude burst signal 318 of a single second frequency and a zero amplitude null signal 316. Typically, the servo signals 320, 310 and 322 are provided with servo guard bands 324 and 326 to protect the outer bands 320 and 322 from noise resulting from the data track areas 302 and 304.

It is desirable that the servo edges are separated by a predetermined nominal distance 350 employed for prerecording the servo signals. Typically, the outer servo signals 320, 322 are recorded first, and the center servo signal 310 is recorded last, to provide the servo edges 312, 314. There is, typically, variation in the magnetic separation 350 between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation 350 distance of the prerecorded servo tracks from nominal, the prerecording of the servo signals is conducted at different amplitudes so as to attempt to compensate for the physical difference and provide a magnetic pattern that is closer to nominal. Additionally, three servo sensors are employed to simultaneously sense the three servo tracks. Thus, the difference in physical distance and the amplitude compensation may tend to offset each other with respect to the resultant apparent distance between the servo tracks. These actions may provide an adequate signal for track following at the servo edges.

However, to increase data track density, in the embodiment of FIG. 3A four servo index positions, i.e. index positions 0, 1, 2, and 3, are calibrated. These index positions are laterally offset with respect to the sensed servo edges of the set of linear servo edges. Index position 0 corresponds to placement of sensor 330 over tape track position 340. Similarly, index positions 1, 2, and 3, respectively, correspond to placement of sensors 332, 334, and 336, respectively, over tape track positions 342, 344, and 346, respectively. The relative positions of these four index positions are: 0, 2, 1, 3.

As an example, the servo index positions may be offset laterally about one quarter the width of the inner band 310 away from the servo edge in either direction, providing four index positions. Servo sensors 330, 332, 334 and 336 are provided and are substantially the same sensing width as the predetermined distance 350. The indexed positions are determined by measuring the ratio between the amplitudes of the two dissimilar recorded servo signals, e.g., as measured by the servo detector 140 of FIG. 1, and called the "position error signal", or "PES". The servo logic 160 operates the servo track follower 150 to track follow at the desired measured ratio. For example, the measured ratio will be the ratio between the sum of the sensed outer band signal 320 plus the inner band signal 318, and the sensed outer band signal 320, giving effect to the null 316. The illustrations and descriptions herein employ this ratio.

Alternatively, the measured ratio may be the ratio between the outer band signal 320 at frequency F1 and the inner band signal 318 at frequency F2. In order to center the data read/write elements at each of the servo index positions, the ratios must be measured precisely. Thus, when the amplitudes of the recorded servo signals are varied to compensate for physical distance variations, the measured ratios are distorted and track following the prerecorded servo edges at the offset indexed positions becomes less precise. As the result, the data tracks may vary from the desired positions, for example, squeezed together, such that writing on one track with a write element that is subject to track misregistration (TMR) may cause a data error on the immediately adjacent data track.

FIG. 3B illustrates another embodiment of displaced index positions that may be employed with the present invention. This embodiment includes six index positions, i.e. index positions 0, 1, 2, 3, 4, and 5. At the "0" or "1" index positions, the servo element is located at position 360 centered on servo edge 312 or at position 361 centered on servo edge 314. Additional index positions are provided which are aligned such that a servo element is displaced from an edge 312 or 314 in either direction. As the result, the number of index positions becomes six. The relative positions of these six index positions are: 2, 0, 4, 3, 1, 5.

In order to center the data read/write elements in the "2" and "5" index positions, the servo read element must be located at position 362 or at position 365, and will read a minimum signal that has an amplitude ratio of about ⅚ of the maximum signal, and to center the data read/write elements in the "3" and "4" index positions, the servo read element must be located at position 363 or at position 364, and will read a minimum signal that has an amplitude ratio of about ⅙ of the maximum signal.

To track follow an edge or edges, once a servo edge or edges are selected, the servo gap selector 130 of FIG. 1 provides the servo signals to a servo detector 140, which digitally detects the servo signals at a predetermined sample rate, and provides servo signal ratios of each of the selected servo sensors. The servo logic 160 employs the servo signal ratios to determine the displacement from the edges and operates the servo loop servo track follower 150 to position the tape head 190 to track follow at the desired displacement from the edges.

As those skilled in the art will appreciate, information can be written to a magnetic tape using one or a variety of recording formats. These various recording formats include a variety of data track densities. In certain recording formats, 128 discrete data tracks are employed. In certain recording formats, 256 discrete data tracks are employed. In certain embodiments, 384 discrete data tracks are used.

Referring now to FIG. 4, the logical image of tape 400 includes a Physical Beginning of Tape ("PBOT") 405 comprising a first end of tape 400. Tape 400 further includes first tape region 410 beginning at PBOT 405 and extending to position 415. The Volume Control Region ("VCR") 420 begins at position 415 and extends to position 425. As those skilled in the art will appreciate, VCR 420 includes, for example, information needed by a data storage drive to read/write information to tape 400, including the tape format used.

Tape 400 further includes a third tape region beginning at position 425 and ending at position 435. Position 435 comprises the Logical Beginning of Tape ("LBOT"). Information can be written to tape 400 between LBOT 435 and the Logical End of Tape ("LEOT") 455. Physical End of Tape ("PEOT") 460 comprises the second end of tape 400. In certain embodiments, the LEOT also comprises the PEOT.

As noted above, in order to read/write information from/to a magnetic tape, that tape generally must be moved bidirectionally along its long axis. Such bidirectional movement results in the tape being stopped, and the direction of movement reversed, within third portion 430. Applicants have found that such normal "wear and tear" may result in physical damage to third region 430. In addition, Applicants have found that routine use of a magnetic tape, such as tape 400, results in an accumulation of debris on first portion 410, VCR 420, and/or third portion 430.

In order to reformat a tape comprising a first format, i.e. 128 data track format, to a tape comprising a second format, i.e. 384 data track format, the information previously written to the tape, including the VCR, must be erased. After the information written to the tape using the first format has been erased, a new volume control region ("VCR") is written to the tape, where that new VCR specifies, inter alia, use of the 384 data track format. After writing the new VCR, the tape head is then positioned between LBOT 435 and LEOT 455 in order to write new information to the tape using the second format.

Using a tape head comprising read/write elements dimensioned for a 128 data track format, erasure of a magnetic tape can sometimes be accomplished by placing the tape head in a stationary position, and moving the tape one time past that stationery tape head. The tape is erased by, for example, writing a null pattern is written to the tape to destroy the information previously written to that tape. Applicants have found, however, that tape drive systems using open channel guiding cannot be adequately erased using a stationary tape head. Therefore, when using open channel guiding, erasure of the tape requires the tape head track follow the servo patterns disposed on the magnetic tape.

Moreover, in order to read/write information using a 384 data track format the individual read/write elements disposed on the tape head, such as tape head 190 (FIG. 1), must necessarily be smaller in dimension than the read/write elements used to write 128 data tracks. In certain embodiments, each data track in a 128 track format tape is about 80 microns wide. On the other hand, in certain embodiments each data track in a 384 data track format is about 27 microns wide. Therefore, erasing a 128 data track format tape using a tape head dimensioned for a 384 data track format requires the tape head track follow the recorded servo signal patterns. In addition, erasure using such a tape head requires multiple passes of tape past the tape head.

Applicants' have found, however, that track following the recorded servo patterns in the first portion 410, VCR 420, and/or third portion 430 can be difficult because of the afore-described physical damage and/or accumulation of debris on regions 410/420/430. Such physical damage can result in discontinuous servo patterns in regions 410/420/430. In addition, such debris can alter the magnetic properties of the tape in regions 410/420/430, resulting in a loss of coherent servo signals.

Using prior art methods, if the servo signal is lost during the erase operation such that track following is no longer possible, the erase operation is stopped and the placed in a "failed" status. Such a failed erase operation precludes subsequent reformatting of the tape. As those skilled in the art will appreciate, the inability to reformat existing tapes, and to thereafter write information to those reformatted tapes using a higher track density recording format, is both time and cost inefficient. Applicants' method provides a mechanism wherein many tapes that cannot be reformatted using prior art methods can nonetheless be kept in service, and can be reformatted using a higher track density format.

Figure 7A:
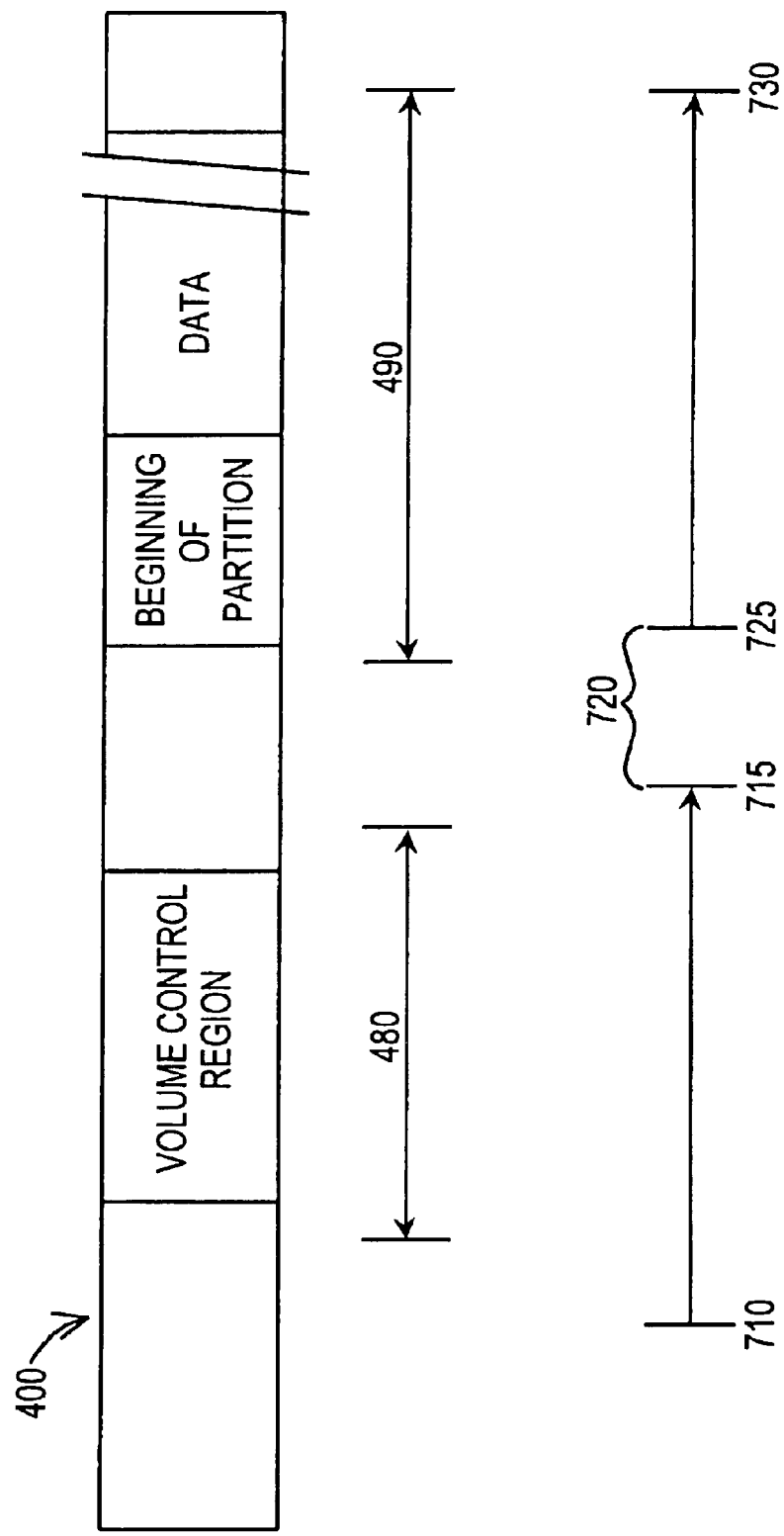
FIG. 7A is a block diagram showing one implementation of Applicants' method.

Referring again to FIG. 4, in order to reformat tape 400, prior art methods erase tape 400 from about position 470 to either LEOT 455 or PEOT 460. Using these prior art methods the entire tape is "erased." Applicants' method, however, defines certain critical portions and certain non-critical portions of the tape. For example, tape 400 comprises a first critical portion 480. First critical portion extends from position 482 to position 486. First critical portion 480 (FIGS. 4, 7A, 7B) comprises the entirety of VCR 420 (FIGS. 4, 7A, 7B), first buffer zone 484, and second buffer zone 488. Tape 400 further includes second critical portion 490 (FIGS. 4, 7A, 7B). Second critical portion extends from position 492 to position 496. Second critical portion includes fourth portion 440, data 450, third buffer zone 494, and fourth buffer zone 498.

In certain embodiments, the lengths of buffer zones 484, 488, 494, and 498, are determined as a function of the precision of tape positioning. In certain embodiments, buffer zones 484, 488, 494, and 498, are about 1 mm in length. In other embodiments, buffer zones 484,488, 494, and 498, are less than about 1 mm in length. In other embodiments, buffer zones 484, 488, 494, and 498, are more than about 1 mm in length.

In certain embodiments, the lengths of buffer zones 484, 488, 494, and 498, are determined as a function of the length of VCR 420. In certain embodiments, the lengths of buffer zones 484, 488, 494, and 498, are from 0% to 100% the length of VCR 420. In certain embodiments, the lengths of buffer zones 484, 488, 494, and 498, are about 1% the length of VCR 420. In certain embodiments, the lengths of buffer zones 484, 488, 494, and 498, are about 10% the length of VCR 420. In certain embodiments, the lengths of buffer zones 484, 488, 494, and 498, are about 25% the length of VCR 420.

Portions of the tape which do not comprise a critical portion comprise a "non-critical" portion. Using Applicants' method, a magnetic tape can be successfully "erased" if all the information written to the critical portions is erased, even though information may not have been completely erased from one or more non-critical portions of that tape.

Figure 5:
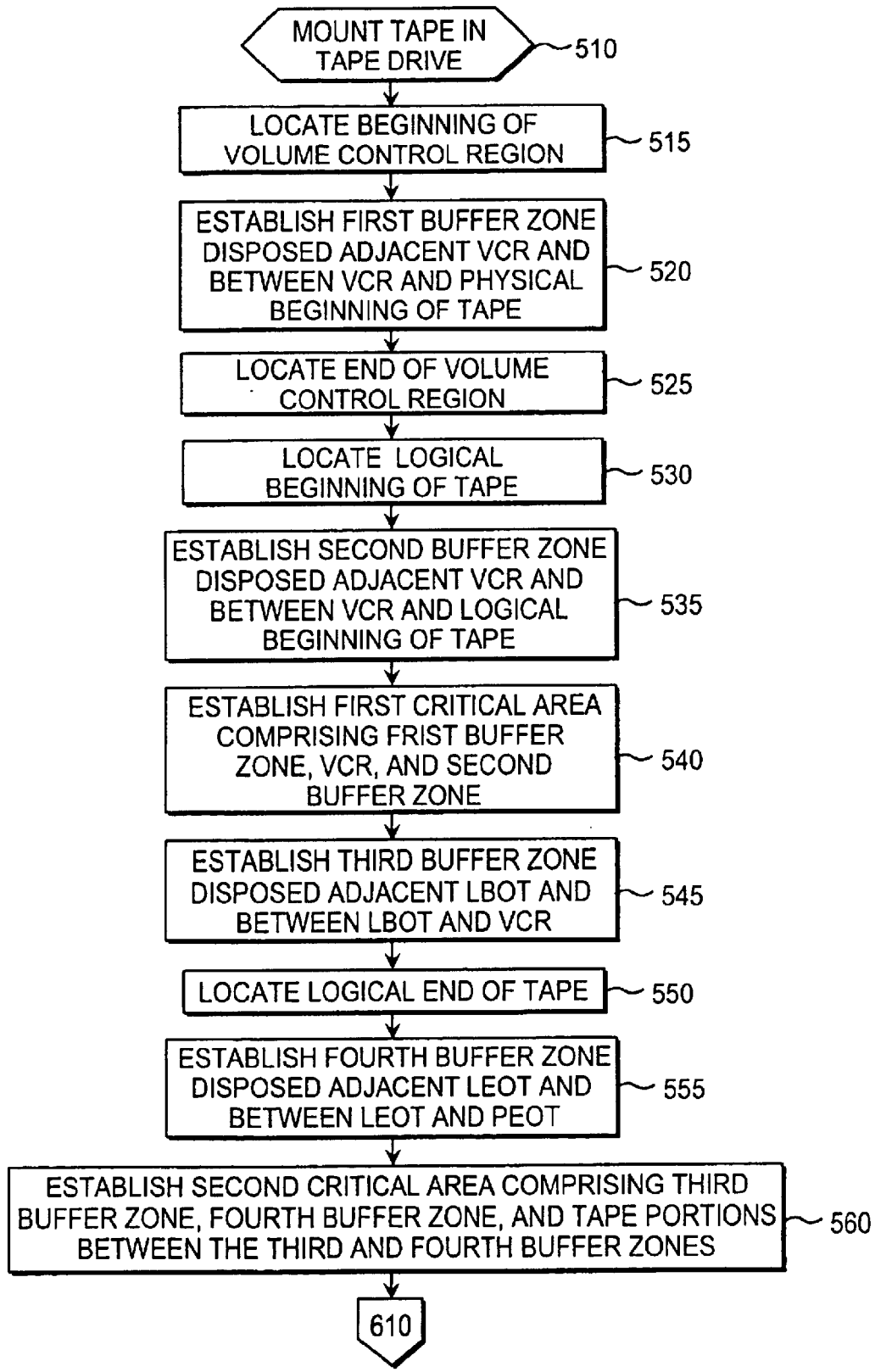
FIG. 5 is a flow chart summarizing the initial steps of one embodiment Applicants' method.

FIG. 5 summarizes the initial steps of Applicants' method. In step 510, a magnetic tape, such as tape 400 (FIG. 4), is mounted in a tape drive, where that tape drive includes a servo system, such as servo system 100 (FIG. 1), which is capable of track following one or more servo patterns written to the magnetic tape. Applicants' method transitions from step 510 to step 515 wherein Applicants' method locates the beginning of the volume control region, such as VCR 420. Applicants' method transitions from step 515 to step 520 wherein Applicants' method establishes a first buffer zone, such as buffer zone 484 (FIG. 4), disposed adjacent the VCR and between the VCR and the PBOT. Applicants' method transitions from step 520 to step 525 wherein Applicants' method locates the end of the VCR. Applicants' method transitions from step 525 to step 530 wherein Applicants' method locates the logical beginning of the tape, such as LBOT 435 (FIG. 4).

Applicants' method transitions from step 530 to step 535 wherein Applicants' method establishes a second buffer zone, such as buffer zone 488 (FIG. 4), disposed adjacent the VCR and between the VCR and the LBOT. Applicants' method transitions from step 535 to step 540 wherein Applicants' method establishes a first critical portion, such as critical portion 480 (FIG. 4) comprising the first buffer zone, the VCR, and the second buffer zone.

Applicants' method transitions from step 540 to step 545 wherein Applicants' method establishes a third buffer zone, such as buffer zone 494, disposed adjacent the LBOT and between the VCR and the LBOT. Applicants' method transitions from step 545 to step 550 wherein Applicants' method locates the logical end of the tape ("LEOT"), such as LEOT 455 (FIG. 4). Applicants' method transitions from step 550 to step 555 wherein Applicants' method establishes a fourth buffer zone, such as buffer zone 498, disposed adjacent the LEOT and between the LEOT and the physical end of tape, such as PEOT 460 (FIG. 4). Applicants' method transitions from step 555 to step 560 wherein Applicants' method establishes a second critical zone comprising the third critical portion, the fourth critical portion, and all tape portions between the third and fourth critical portions.

Figure 6:
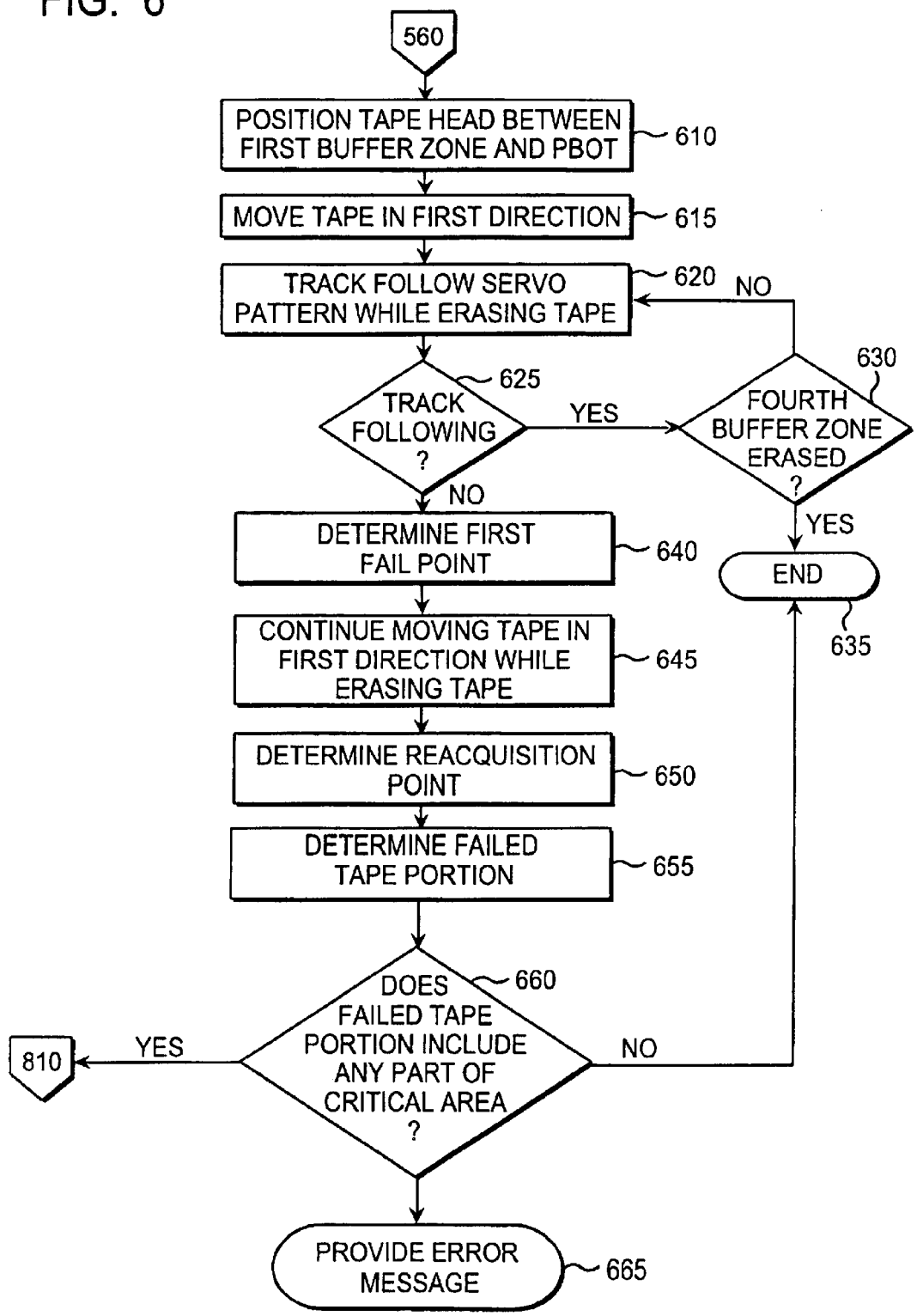
FIG. 6 is a flow chart summarizing additional steps in the first embodiment of Applicants' method.

Referring now to FIG. 6, Applicants' method transitions from step 560 to step 610 wherein Applicants' method positions the tape head between the PBOT, such as PBOT 405 (FIG. 4), and the first buffer zone, such as buffer zone 484 (FIG. 4). Applicants' method transitions from step 610 to step 615 wherein Applicants' method moves the tape in a first direction in the tape drive. Applicants' method transitions from step 615 to step 620 wherein Applicants' method track follows one or more servo patterns disposed on the tape using one or more servo sensors disposed on the tape head while erasing the tape. By erasing the tape, Applicants mean, for example, writing a null pattern to the tape, writing a random frequency waveform to the tape, and the like. Applicants' method transitions from step 620 to step 625 wherein Applicants' method determines if the one or more servo patterns are being track followed.

If Applicants' method determines in step 625 that the one or more servo patterns are not being track followed, then Applicants' method transitions from step 625 to step 630 wherein Applicants' method determines if the fourth buffer zone has been erased. If Applicants' method determines in step 630 that the fourth buffer zone has been erased, then Applicant's method transitions from step 630 to step 635 and ends. Alternatively, if Applicants' method determines in step 630 that the fourth buffer zone has not been erased, then Applicants' method transitions from step 630 to step 620 wherein Applicants' method continues. Applicants' method loops between steps 620, 625, and 630, until the tape is successfully erased or until a track following error is noted.

If Applicants' method determines in step 625 that the one or more servo patterns are not being track followed, i.e. the one or more servo sensors are not adequately detecting the one or more recorded servo patterns, then Applicants' method transitions from step 625 to step 640 wherein Applicants' method determines a first fail point comprising the location on the tape where the servo system first fails to track follow the servo pattern, i.e. the location where the one or more servo sensors first fail to detect the one or more servo patterns. Applicants' method transitions from step 640 to step 645 wherein Applicants' method continues moving the tape in the first direction while erasing the tape. Applicants' method transitions from step 645 to step 650 wherein Applicants' method determines a reacquisition point comprising the location where the servo system resumes track following the servo pattern, i.e. the location where the one or more servo sensors again detect the one or more servo patterns.

Applicants' method transitions from step 650 to step 655 wherein Applicants' method determines a failed tape portion, where that failed tape portion comprises that portion of the magnetic tape disposed between the first fail point and the reacquisition point. Applicants' method transitions from step 655 to step 660 wherein Applicants' method determines if the failed tape portion includes any part of the first critical portion, such as critical portion 480 (FIG. 4), or any part of the second critical portion, such as critical portion 490 (FIG. 4). If Applicants' method determines in step 660 that the failed tape portion does not include any part of either the first critical portion or the second critical portion, then Applicants' method transitions from step 660 to step 635 and ends.

Referring now to FIG. 7A, in accord with step 610 (FIG. 6) the tape head is positioned at point 710. In accord with steps 615 (FIG. 6) and 620 (FIG. 6), the tape is moved in a first direction and the tape erased. By erasing the tape, Applicants mean, for example, writing a null pattern to the tape, writing a random frequency waveform to the tape, and the like. In accord with steps 625 (FIG. 6), 640 (FIG. 6), 645 (FIG. 6), and 650 (FIG. 6), Applicants' method determines that the servo pattern was not track followed between first fail point 715 and reacquisition point 725, with tape portion 720 comprising a failed tape portion. In step 660 (FIG. 6), Applicants' method determines that failed tape portion 720 does not includes any portion of first critical zone 480 or second critical zone 490. Therefore in the embodiment of FIG. 7A, Applicants' method to erase tape 400 ends successfully even though failed tape portion 720 may not have been completely erased.

Referring now to FIG. 7B, in accord with step 610 (FIG. 6) the tape head is positioned at point 740. In accord with steps 615 (FIG. 6) and 620 (FIG. 6), the tape is moved in a first direction and the tape is erased. In accord with steps 625 (FIG. 6), 640 (FIG. 6), 645 (FIG. 6), and 650 (FIG. 6), Applicants' method determines that the servo pattern was not track followed between first fail point 750 and reacquisition point 760, with tape portion 755 comprising a failed tape portion. In step 660 (FIG. 6), Applicants' method determines that failed tape portion 755 does includes a portion of first critical zone 480.

Referring again to FIGS. 6 and 7B, in the embodiment of FIG. 7B certain embodiments of Applicants' method transition from step 660 to step 665 wherein Applicants' method provides an error message. In other embodiments, if Applicants' method determines in step 660 that the failed tape portion includes a portion of one or more critical zones, then Applicants' method transitions from step 660 to step 810 (FIG. 8).

Figure 8:
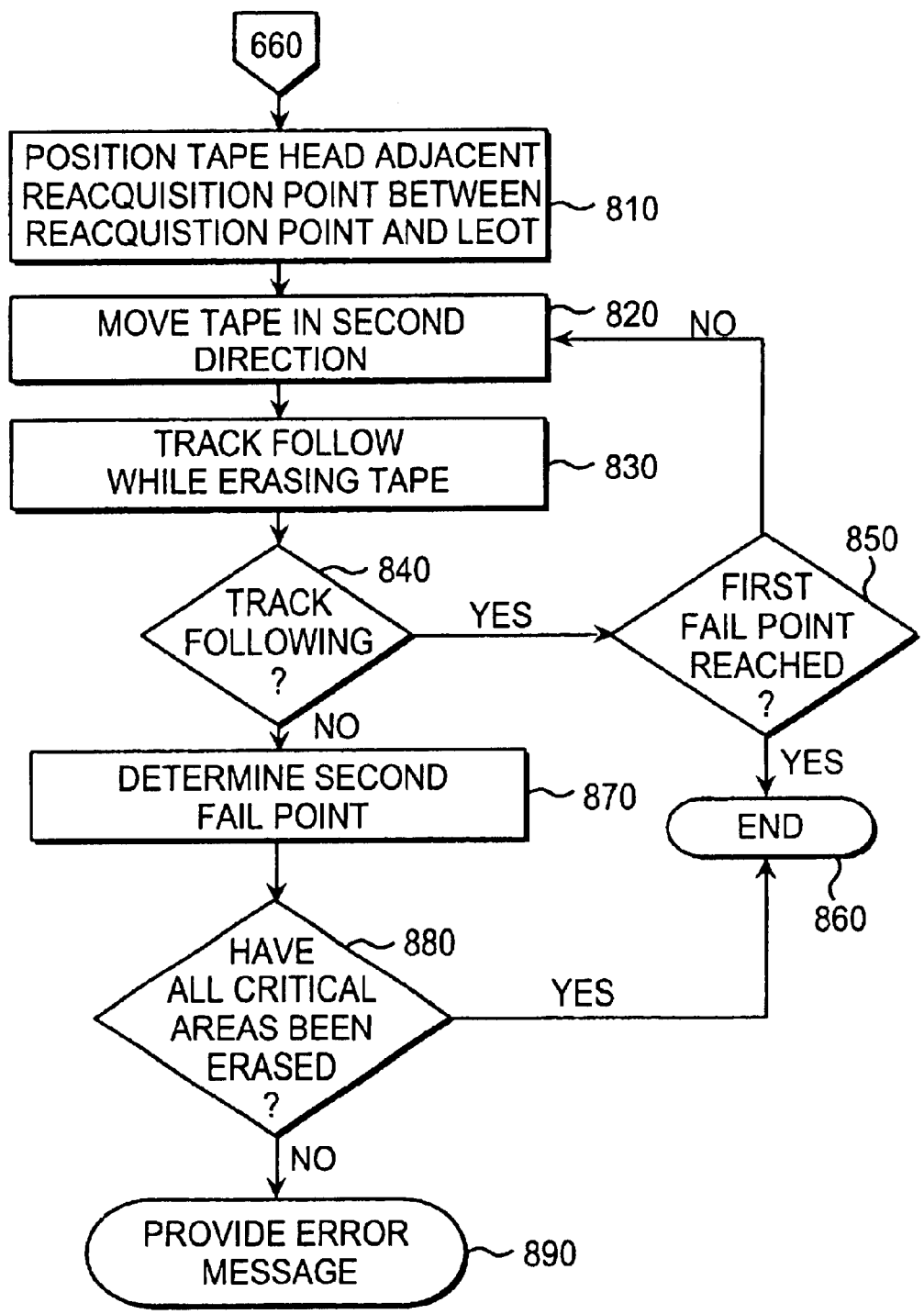
FIG. 8 is a flow chart summarizing additional steps of a second embodiment of Applicants' method.

Referring now to FIG. 8, in step 810 Applicants' method positions the tape head adjacent the reacquisition point between that reacquisition point and the LEOT, such as point 780. Applicants' method transitions from step 810 to step 820 wherein Applicants' method moves the tape in a second direction, i.e. in the direction opposite to the first direction. Applicants' method transitions from step 820 to step 830 wherein Applicants' method track follows one or more servo patterns while erasing the tape as the tape moves in the second direction.

As the tape moves in the second direction and as that tape is erased, Applicants' method in step 840 continuously monitors whether the one or more servo patterns are being track followed. If Applicants' method determines in step 840 that the servo pattern is being followed, then Applicants' method transitions to step 850 wherein Applicants' method determines if the first fail point has been reached. If Applicants' method determines in step 850 that the first fail point has been reached, then Applicants' method transitions from step 850 to step 860 and ends. Alternatively, if Applicants' method determines in step 850 that the first fail point has not been reached, then Applicants' method transitions from step 850 to step 820 and Applicants' method continues.

If Applicants' method determines in step 840 that the servo pattern is not being followed, then Applicants' method transitions from step 840 to step 870 wherein Applicants' method determines a second fail point, where the second fail point comprises the location on the tape where the servo system first failed to track follow the servo pattern as the tape moved in the second direction. In certain embodiments, Applicants' method in step 870 determines a second failed tape portion, where that second failed tape portion includes the portion of tape disposed between the first fail point and the second fail point. Applicants' method transitions from step 870 to step 880 wherein Applicants' method determines if all the critical portions have been erased.

If Applicants' method determines in step 880 that all the critical portions have been erased, then Applicants' method transitions from step 880 to step 860 and ends. Alternatively, if Applicants' method determines in step 880 that all the critical portions have not been erased, then Applicants' method transitions from step 880 to step 890 wherein Applicants' method provides an error message.

Referring to FIGS. 7B and 8, in accord with step 810 Applicants' method positions the tape head at position 780. In accord with steps 820 and 830 Applicants' method moves the tape in a second direction while erasing the tape. In accord with steps 840 and 870 Applicants' method determines that the servo system first failed to track follow the servo pattern at second fail point 790 while moving the tape in the second direction. In certain embodiments, Applicants' method determines a second failed tape portion, where second failed tape portion 795 comprises the portion of tape disposed between first fail point 750 and second fail point 790.

In step 880, Applicants' method determines that in the embodiment of FIG. 7B, all critical portions have been erased, i.e. second failed tape portion 795 does not include any part of first critical portion 480 or any part of second critical portion 490. Therefore, Applicants' method end successfully at step 860 even though second failed tape portion 795 might not be completely erased.

In certain embodiments, one or more individual steps of Applicants' method summarized in FIGS. 5, 6, and 8, may be combined, eliminated, or reordered. In certain embodiments, Applicants' method comprises the steps of FIGS. 5 and 6.

Applicants' method further includes an article of manufacture comprising a computer useable medium having computer readable program code disposed therein to erase a magnetic tape. In certain embodiments, Applicants' article of manufacture comprises a tape drive. In certain embodiments, Applicants' invention further includes a data storage and retrieval system which includes one or more of Applicants' tape drives comprising such a computer useable medium having computer readable code disposed therein to erase a magnetic tape. In certain embodiments, Applicants' article of manufacture comprises a data storage and retrieval system which includes a library controller comprising such a computer useable medium having computer readable code disposed therein to erase a magnetic tape. Applicants' invention further includes a computer program product usable with a programmable computer processor having computer readable program code embodied therein to erase a magnetic tape.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to erase a magnetic tape, wherein said magnetic tape comprises at least one servo pattern comprising an interface between a first recorded signal and a second recorded signal, comprising the steps of:

providing a tape drive, wherein said tape drive comprises a servo system capable of track following said servo pattern;

mounting a magnetic tape in said tape drive, wherein said magnetic tape comprises a physical beginning of tape ("PBOT"), a physical end of tape ("PEOT"), and information written on said magnetic tape between said PBOT and said PEOT;

establishing one or more critical portions located on said magnetic tape;

moving said magnetic tape in a first direction;

writing a null pattern to said magnetic tape;

determining if said servo system is track following said servo pattern;

determining if each of said one or more critical portions have been erased;

operative if each of said one or more critical portions have not been erased, providing an error message.

2. The method of claim 1, wherein said servo system is not track following said servo pattern, further comprising the steps of:

determining a first fail point comprising the location on said magnetic tape where said servo system first failed to track follow said servo pattern;

determining a reacquisition point comprising the location on said magnetic tape where said servo system resumes track following said servo pattern;

determining a first failed tape portion comprising the tape portion disposed between said first fail point and said reacquisition point;

determining if said first failed tape portion comprises any part of said one or more critical portions.

3. The method of claim 2, wherein said first failed tape portion includes a part of said one or more critical portions, further comprising the step of providing an error message.

4. The method of claim 2, wherein said first failed tape portion includes a part of said one or more critical portions, further comprising the steps of:

positioning said tape head adjacent said reacquisition point and between said acquisition point an said PEOT;

moving said tape head in a second direction;

erasing said magnetic tape;

determining if said servo system is track following said servo pattern;

operative if said servo system is not track following said servo pattern:

determining a second fail point comprising the location on said magnetic tape where said servo system first failed to track follow said servo pattern while moving said magnetic tape in said second direction;

determining a second failed tape portion comprising the tape portion disposed between said first fail point and said second fail point;

determining if said second failed tape portion comprises any part of said one or more critical portions;

operative if said second failed tape portion includes any part of said one or more critical portions, providing an error message.

5. The method of claim 4, wherein said magnetic tape comprises:
- a Volume Control Region ("VCR");
- a first portion disposed between said PBOT and said VCR;
- a logical beginning of tape ("LBOT");
- a third portion disposed between said VCR and said LBOT;
- a logical end of tape ("LEOT");
- a fourth portion disposed between said LBOT and said LEOT; and
- a fifth portion disposed between said LEOT and said PEOT.

6. The method of claim 5, wherein said tape further comprises;
- a first critical portion comprising said VCR; and
- a second critical portion comprising said fourth portion.

7. The method of claim 6, wherein said tape further comprises:
- a first buffer zone disposed between said first portion and said VCR;
- a second buffer zone disposed between said VCR and said third portion;
- a third buffer zone disposed between said third portion and said LBOT;
- a fourth buffer zone disposed between said LEOT and said PEOT;
- wherein said first critical portion further comprises said first buffer zone and said second buffer zone, and wherein said second critical portion further comprises said third buffer zone and said fourth buffer zone.

8. A method to erase a magnetic tape, wherein said magnetic tape comprises information written thereon, at least one servo pattern comprising an interface between a first recorded signal and a second recorded signal, a physical beginning of tape ("PBOT"), a Volume Control Region ("VCR"), a first portion disposed between said PBOT and said VCR, a logical beginning of tape ("LBOT"), a third portion disposed between said VCR and said LBOT, a logical end of tape ("LEOT"), a fourth portion disposed between said LBOT and said LEOT, a physical end of tape ("PEOT"), a fifth portion disposed between said LEOT and said PEOT, said method comprising the steps of,
- providing a tape drive, wherein said tape drive comprises a servo system capable of track following said servo pattern;
- mounting said magnetic tape in said tape drive;
- establishing a first buffer zone disposed between said first portion and said VCR;
- establishing a second buffer zone disposed between said VCR and said third portion;
- establishing a third buffer zone disposed between said third portion and said LBOT;
- establishing a fourth buffer zone disposed between said LEOT and said PEOT;
- establishing a first critical portion comprising said first buffer zone, said VCR, and said second buffer zone;
- establishing a second critical portion comprising said third buffer zone, said fourth portion, and said fourth buffer zone;
- moving said magnetic tape in a first direction while erasing said magnetic tape;
- determining if said servo system is track following said servo pattern;
- operative if said servo system is not track following said servo pattern:
- determining a first fail point comprising the location on said magnetic tape where said servo system first fails to track follow said servo pattern;
- determining a reacquisition point comprising the location on said magnetic tape where said servo system resumes track following said servo pattern;
- determining a first failed tape portion comprising the tape portion disposed between said first fail point and said reacquisition point;
- determining if said first failed tape portion comprises any part of said first critical portion any part of said second critical portion;
- operative if said first failed tape portion comprises any part of said first critical portion or any part of said second critical portion:
- positioning said tape head adjacent said reacquisition point and between said acquisition point an said LEOT;
- moving said magnetic tape in a second direction;
- erasing said magnetic tape;
- determining if said servo system is track following said servo pattern;
- operative if said servo system is not track following said servo pattern:
- determining a second fail point comprising the location on said magnetic tape where said servo system first fails to track following said servo pattern while moving said magnetic tape in said second direction;
- determining a second failed tape portion comprising the tape portion disposed between said first fail point and said second fail point;
- determining if said second failed tape portion comprises any part of said first critical portion or any part of said second critical area;
- operative if said second failed tape portion includes any part of said first critical area or any part of said second critical area, providing an error message.

9. An article of manufacture comprising a computer useable medium having computer readable program code disposed therein to erase a magnetic tape wherein said magnetic tape comprises at least one servo pattern comprising an interface between a first recorded signal and a second recorded signal, said computer readable program code comprising a series of computer readable program steps to effect:
- mounting a magnetic tape in a tape drive, wherein said magnetic tape comprises a physical beginning of tape ("PBOT"), a physical end of tape ("PEOT"), and information written on said magnetic tape between said PBOT and said PEOT, and wherein said tape drive comprises a servo system capable of track following said servo pattern;
- establishing one or more critical portions located on said magnetic tape;
- moving said magnetic tape in a first direction;
- writing a null pattern to said magnetic tape;
- determining if said servo system is track following said servo pattern;
- determining if each of said one or more critical portions have been erased;
- operative if each of said one or more critical portions have not been erased, providing an error message.

10. The article of manufacture of claim 9, said computer readable program code further comprising a series of computer readable program steps to effect:
  determining a first fail point comprising the location on said magnetic tape where said servo system first fails to track follow said servo pattern;
  determining a reacquisition point comprising the location on said magnetic tape where said servo system resumes track following said servo pattern;
  determining a first failed tape portion comprising the tape portion disposed between said first fail point and said reacquisition point;
  determining if said first failed tape portion comprises any part of said one or more critical portions.

11. The article of manufacture of claim 10, wherein, said computer readable program code further comprising a series of computer readable program steps to effect providing an error message if said first failed tape portion includes a part of said one or more critical portions.

12. The article of manufacture of claim 10, said computer readable program code further comprises a series of computer readable program steps to effect:
  positioning said tape head adjacent said reacquisition point and between said acquisition point and said PEOT;
  moving said magnetic tape in a second direction;
  erasing said magnetic tape while moving said magnetic tape in said second direction;
  determining if said servo system is track following said servo pattern while moving said magnetic tape in said second direction;
  operative if said servo system is not track following said servo pattern while moving said magnetic tape in said second direction;
  determining a second fail point comprising the location on said magnetic tape where said servo system first failed to track follow said servo pattern while moving said magnetic tape in said second direction;
  determining a second failed tape portion comprising the tape portion disposed between said first fail point and said second fail point;
  determining if said second failed tape portion comprises any part of said one or more critical portions;
  operative if said second failed tape portion includes any part of said one or more critical portions, providing an error message.

13. The article of manufacture of claim 9, wherein said article of manufacture comprises a tape drive.

14. The article of manufacture of claim 9, wherein said article of manufacture comprises a data storage and retrieval system.

15. A tape drive comprising a computer useable medium having computer readable program code disposed therein to erase a magnetic tape, wherein said magnetic tape comprises information written thereon, at least one servo pattern comprising an interface between a first recorded signal and a second recorded signal, a physical beginning of tape ("PBOT"), a Volume Control Region ("VCR"), a first portion disposed between said PBOT and said VCR, a logical beginning of tape ("LBOT"), a third portion disposed between said VCR an said LBOT, a logical end of tape ("LEOT"), a fourth portion disposed between said LBOT and said LEOT, a physical end of tape ("PEOT"), a fifth portion disposed between said LEOT and said PEOT, the computer readable program code comprising a series of computer readable program steps to effect:
  mounting said magnetic tape in said tape drive, wherein said tape drive further comprises a servo system capable of track following said servo pattern;
  establishing a first buffer zone disposed between said first portion and said VCR;
  establishing a second buffer zone disposed between said VCR and said third portion;
  establishing a third buffer zone disposed between said third portion and said LBOT;
  establishing a fourth buffer zone disposed between said LEOT and said PEOT;
  establishing a first critical portion comprising said first buffer zone, said VCR, and said second buffer zone;
  establishing a second critical portion comprising said third buffer zone, said fourth portion, and said fourth buffer zone;
  moving said magnetic tape in a first direction while erasing said magnetic tape;
  determining if said servo system is track following said servo pattern;
  operative if said servo system is not track following said servo pattern:
  determining a first fail point comprising the location on said magnetic tape where said servo system first failed to track follow said servo pattern;
  determining a reacquisition point comprising the location on said magnetic tape where said servo system resumes track following said servo pattern;
  determining a first failed tape portion comprising the tape portion disposed between said first fail point and said reacquisition point;
  determining if said first failed tape portion comprises any part of said first critical portion or any part of said second critical portion;
  operative if said first failed tape portion comprises any part of said first critical portion or any part of said second critical portion:
  positioning said tape head adjacent said reacquisition point and between said acquisition point and said LEOT;
  moving said magnetic tape in a second direction;
  erasing said magnetic tape while moving said magnetic tape in said second direction;
  determining if said servo system is track following said servo pattern while moving said magnetic tape in said second direction;
  operative if said servo system is track following said servo pattern while moving said magnetic tape in said second direction:
  determining a second fail point comprising the location on said magnetic tape where said servo system failed to track follow said servo pattern while moving said magnetic tape in said second direction;
  determining a second failed tape portion comprising the tape portion disposed between said first fail point and said second fail point;
  determining if said second failed tape portion comprises any part of said first critical portion or any part of said second critical portion;
  operative if said second failed tape portion includes any part of said first critical portion or any part of said second critical portion, providing an error message.

16. A data storage and retrieval system comprising a computer useable medium having computer readable program code disposed therein to erase a magnetic tape, wherein said magnetic tape comprises information written thereon, at least one servo pattern comprising an interface between a first recorded signal and a second recorded signal, a physical beginning of tape ("PBOT"), a Volume Control Region ("VCR"), a first portion disposed between said PBOT and said VCR, a logical beginning of tape ("LBOT"), a third portion disposed between said VCR and said LBOT, a logical end of tape ("LEOT"), a fourth portion disposed between said LBOT and said LEOT, a physical end of tape ("PEOT"), a fifth portion disposed between said LEOT and said PEOT, wherein said data storage and retrieval system further comprises a tape drive comprising a servo system capable of track following said servo pattern, the computer readable program code comprising a series of computer readable program steps to effect:

mounting said magnetic tape in said tape drive;

establishing a first buffer zone disposed between said first portion and said VCR;

establishing a second buffer zone disposed between said VCR and said third portion;

establishing a third buffer zone disposed between said third portion and said LBOT;

establishing a fourth buffer zone disposed between said LEOT and said PEOT;

establishing a first critical portion comprising said first buffer zone, said VCR, and said second buffer zone;

establishing a second critical portion comprising said third buffer zone, said fourth portion, and said fourth buffer zone;

moving said magnetic tape in a first direction while erasing said magnetic tape;

determining if said servo system is track following said servo pattern;

operative if said servo system is not track following said servo pattern:

determining a first fail point comprising the location on said magnetic tape where said servo system first failed to track follow said servo pattern;

determining a reacquisition point comprising the location on said magnetic tape where said servo system resumes track following said servo pattern;

determining a first failed tape portion comprising the tape portion disposed between said first fail point and said reacquisition point;

determining if said first failed tape portion comprises any part of said first critical portion or any part of said second critical portion;

operative if said first failed tape portion comprises any part of said first critical portion or any part of said second critical portion:

positioning said tape head adjacent said reacquisition point and between said acquisition point and said LEOT;

moving said magnetic tape in a second direction;

erasing said magnetic tape while moving said magnetic tape in said second direction;

determining if said servo system is track following said servo pattern while moving said magnetic tape in said second direction;

operative if said servo system is not track following said servo pattern while moving said magnetic tape in said second direction:

determining a second fail point comprising the location on said magnetic tape where said servo system first failed to track follow said servo pattern while moving said magnetic tape in said second direction;

determining a second failed tape portion comprising the tape portion disposed between said first fail point and said second fail point;

determining if said second failed tape portion comprises any part of said first critical portion of any part of said second critical portion;

operative if said second failed tape portion includes any part of said first critical portion or any part of said second critical portion, providing an error message.

17. A computer program product usable with a programmable computer processor having computer readable program code embodied therein to erase a magnetic tape, wherein said magnetic tape comprises at least one servo pattern comprising an interface between a first recorded signal and a second recorded signal, comprising:

computer readable program code which causes said programmable computer processor to mount a magnetic tape in a tape drive, wherein said magnetic tape comprises a physical beginning of tape ("PBOT"), a physical end of tape ("PEOT"), and information written on said magnetic tape between said PBOT and said PEOT, and wherein said tape drive comprises a servo system capable of track following said servo pattern;

computer readable program code which causes said programmable computer processor to establish one or more critical portions located on said magnetic tape;

computer readable program code which causes said programmable computer processor to move said magnetic tape in a first direction;

computer readable program code which causes said programmable computer processor to write a null pattern to said magnetic tape;

computer readable program code which causes said programmable computer processor to determine if said servo system is track following said servo pattern;

computer readable program code which causes said programmable computer processor to determine if each of said one or more critical portions have been erased;

computer readable program code which, if each of said one or more critical portions have not been erased, causes said programmable computer processor to provide an error message.

18. The computer program product of claim 17 further comprising:

computer readable program code which causes said programmable computer processor to determine a first fail point comprising the location on said magnetic tape where said servo system first failed to track follow said servo pattern;

computer readable program code which causes said programmable computer processor to determine a reacquisition point comprising the location on said magnetic tape where said servo system resumed track following said servo pattern;

computer readable program code which causes said programmable computer processor to determine a first failed tape portion comprising the tape portion disposed between said first fail point and said reacquisition point;

computer readable program code which causes said programmable computer processor to determine if said first failed tape portion comprises any part of said one or more critical portions.

19. The computer program product of claim 18, further comprising computer readable program code which causes said programmable computer processor to provide an error message if said first fails tape portion includes a part of said one or more critical portions.

20. The computer program product of claim 18, further comprising:
- computer readable program code which causes said programmable computer processor to position said tape head adjacent said reacquisition point and between said acquisition point and said PEOT;
- computer readable program code which causes said programmable computer processor to move said tape head in a second direction;
- computer readable program code which causes said programmable computer processor to erase said magnetic tape while moving said magnetic tape in said second direction;
- computer readable program code which causes said programmable computer processor to determine if said servo system is track following said servo pattern while moving said magnetic tape in said second direction;
- computer readable program code which causes said programmable computer processor to determine a second fail point comprising the location on said magnetic tape where said servo system first failed to track follow said servo pattern while moving said magnetic tape in said second direction;
- computer readable program code which causes said programmable computer processor to determine a second failed tape portion comprising the tape portion disposed between said first fail point and said second fail point;
- computer readable program code which causes said programmable computer processor to determine if said second failed tape portion comprises any part of said one or more critical portions;
- computer readable program code which, if said second failed tape portion includes any part of said one or more critical portions, causes said programmable computer processor to provide an error message.

21. A computer program product usable with a programmable computer processor having computer readable program code embodied therein to method to erase a magnetic tape, wherein said magnetic tape comprises information written thereon, at least one servo pattern comprising an interface between a first recorded signal and a second recorded signal a physical beginning of tape ("PBOT"), a Volume Control Region ("VCR"), a first portion disposed between said PBOT and said VCR, a logical beginning of tape ("LBOT"), a third portion disposed between said VCR and said LBOT, a logical end of tape ("LEOT"), a fourth portion disposed between said LBOT and said LEOT, a physical end of tape ("PEOT"), a fifth portion disposed between said LEOT and said PEOT, comprising:
- computer readable program code which causes said programmable computer processor to mount said magnetic tape in said tape drive, wherein said tape drive comprises a servo system capable of track following said servo pattern;
- computer readable program code which causes said programmable computer processor to establish a first buffer zone disposed between said first portion and said VCR;
- computer readable program code which causes said programmable computer processor to establish a second buffer zone disposed between said VCR and said third portion;
- computer readable program code which causes said programmable computer processor to establish a third buffer zone disposed between said third portion and said LBOT;
- computer readable program code which causes said programmable computer processor to establish a fourth buffer zone disposed between said LEOT and said PEOT;
- computer readable program code which causes said programmable computer processor to establish a first critical portion comprising said first buffer zone, said VCR, and said second buffer zone;
- computer readable program code which causes said programmable computer processor to establish a second critical portion comprising said third buffer zone, said fourth portion, and said fourth buffer zone;
- computer readable program code which causes said programmable computer processor to move said magnetic tape in a first direction while erasing said magnetic tape;
- computer readable program code which causes said programmable computer processor to determine if said servo system is track following said servo pattern;
- computer readable program code which causes said programmable computer processor to determine a first fail point comprising the location on said magnetic tape where said servo system first fails to track follow said servo pattern;
- computer readable program code which causes said programmable computer processor to determine a reacquisition point comprising the location on said magnetic tape where said servo system resumed track following said servo pattern;
- computer readable program code which causes said programmable computer processor to determine a first failed tape portion comprising the tape portion disposed between said first fail point and said reacquisition point;
- computer readable program code which causes said programmable computer processor to determine if said first failed tape portion comprises any part of said first critical portion or any part of said second critical portion;
- computer readable program code which causes said programmable computer processor to position said tape head adjacent said reacquisition point and between said acquisition point and said LEOT;
- computer readable program code which causes said programmable computer processor to move said magnetic tape in a second direction;
- computer readable program code which causes said programmable computer processor to erase said magnetic tape while said magnetic tape is moving in said second direction;
- computer readable program code which causes said programmable computer processor to determine if said servo system is track following said servo pattern while moving said magnetic tape in said second direction;
- computer readable program code which causes said programmable computer processor to determine a second fail point comprising the location on said magnetic tape where said servo system first failed to track follow said servo pattern while moving said magnetic tape in said second direction;

computer readable program code which causes said programmable computer processor to determine a second failed tape portion comprising the tape portion disposed between said first fail point and said second fail point;

computer readable program code which causes said programmable computer processor to determine if said second failed tape portion comprises any part of said first critical portion of any part of said second critical portion;

computer readable program code which, if said second failed tape portion includes any part of said first critical portion or any part of said second critical portion, causes said programmable computer processor to provide an error message.

* * * * *